(12) United States Patent
Bohner et al.

(10) Patent No.: US 6,279,675 B1
(45) Date of Patent: Aug. 28, 2001

(54) STEERING SYSTEM FOR NON-TRACKED MOTOR VEHICLES

(75) Inventors: Hubert Bohner, Boeblingen; Martin Moser, Fellbach; Reinhold Schneckenburger, Rutesheim, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/388,550

(22) Filed: Sep. 2, 1999

(30) Foreign Application Priority Data

Sep. 2, 1998 (DE) .............................. 198 39 953

(51) Int. Cl.⁷ ..................................... B62D 5/00
(52) U.S. Cl. .................. 180/403; 180/417; 180/421; 701/43
(58) Field of Search .................. 180/403, 405, 180/406, 407, 417, 421, 442; 701/41, 43

(56) References Cited

U.S. PATENT DOCUMENTS

| | | | |
|---|---|---|---|
| 5,097,917 | * | 3/1992 | Serizawa et al. ............... 180/402 |
| 5,862,878 | * | 1/1999 | Bohner et al. .................. 180/403 |
| 5,893,427 | * | 4/1999 | Bohner et al. .................. 180/403 |
| 6,047,788 | * | 1/1999 | Bohner et al. .................. 180/406 |
| 6,059,068 | * | 5/2000 | Kato et al. ..................... 180/402 |
| 6,076,626 | * | 6/2000 | Bohner et al. .................. 180/405 |
| 6,076,627 | * | 6/2000 | Bohner et al. .................. 180/403 |
| 6,102,150 | * | 8/2000 | Bohner et al. .................. 180/403 |
| 6,138,788 | * | 10/2000 | Bohner et al. .................. 180/403 |

FOREIGN PATENT DOCUMENTS

| | | |
|---|---|---|
| 44 22 386 | 9/1995 | (DE) . |
| 195 40 956 | 3/1997 | (DE) . |
| 195 46 942 | 6/1997 | (DE) . |

* cited by examiner

*Primary Examiner*—Daniel G. DePumpo
(74) *Attorney, Agent, or Firm*—Crowell & Moring LLP

(57) ABSTRACT

A steering system of a non-tracked motor vehicle has steered vehicle wheels are connected in normal operation with respect to the effect with a steering handle only by way of an electronic automatic control unit which continuously monitors itself with respect to a correct operation. As a function of a desired-value generator, which is operated by the steering handle, this automatic control system operates an adjusting drive for the steering adjustment of the steered vehicle wheels. In the event of a malfunctioning of the automatic control system, a forced coupling is automatically switched effective between the steering handle and the steered vehicle wheels. This also takes place if the performance limit of the adjusting drive is reached so that the driver is capable of assisting the adjusting drive by the driver's manual force on the steering handle.

8 Claims, 3 Drawing Sheets

STEERING SYSTEM FOR NON-TRACKED MOTOR VEHICLES

BACKGROUND OF THE INVENTION

The present invention relates to a steering system for non-tracked motor vehicles, having a steering handle, such as a manual steering wheel, operated by the driver, and a steering adjusting drive for the steering adjustment of steerable vehicle wheels. A steering-angle desired-value generator operable by way of the steering handle. A steering-angle actual-value generator is operable via the steerable vehicle wheels. An automatic control system controls the steering adjusting drive as a function of a comparison of the desired and actual values of the steering angle and continuously monitors itself as well as a sensor system interacting with it with respect to a malfunctioning. A mechanical or hydraulic forced coupling is arranged between the steering handle and the steerable vehicle wheels and is opened up or remains open (inoperative normal condition) when the automatic control system operates correctly and is automatically closed when the automatic control system is defective (operative special condition).

Steering systems of this type, which operate according to the "steer-by-wire" concept, are basically known and are developed for future motor vehicles. These systems offer the basic advantage that they are suitable at least with respect to the automatic control system as well as the pertaining sensor system without any constructive changes for many different vehicles. As the result of a corresponding programming, on one hand, virtually any transmission ratio can be implemented between the adjusting stroke of the steering handle and the steering angle change of the steered vehicle wheels. Furthermore, the automatic control system can be connected with additional sensors in order to be able to automatically take into account parameters to be defined, such as cross wind influences, or control deviations with respect thereto.

In order to be able to ensure the required amount of safety in the event of the occurrence of a defect in the automatic control system or in the event of a failure of signals which are to be analyzed by the automatic control system, an operating mode is automatically switched on for an abnormal operation or an emergency operation. In this operating mode, a forced coupling is provided between the steering handle and the steered vehicle wheels so that the steering system operates in principle in the manner of a conventional steering system. The mechanical steering column, which is customary in conventional steering systems, can be replaced, however, by other mechanical systems or by hydraulic systems, particularly hydrostatic systems.

SUMMARY OF THE INVENTION

An object of the present invention is to permit, in a steering system of a steered-by-wire type, extreme steering adjusting forces for the steerable vehicle wheels.

According to the invention, this object has been achieved by providing that the automatic control system analyzes or detects a parameter which is correlated with forces or torques transmitted between the steering adjusting drive and the steerable vehicle wheels. In the event of a high loading of the adjusting drive, the forced coupling operative in an assisting manner is switched for the steering adjusting drive.

The present invention is based on the recognition of the advantages of a steering adjusting drive, which, in the normal operation of the steering system, is solely effective for the steering adjustment of the steerable vehicle wheel, with a limited output which, although is must always be sufficient for implementing typical steering maneuvers, is not sufficient for steering maneuvers with an extreme power requirement. Such a case with an extreme power requirement may occur, for example, when the vehicle reaches or takes up a position in which a steerable vehicle wheel by way of a wheel flank or tire flank is directly adjacent to a step or curbstone or slides along the step or curbstone via the wheel flank or tire flank. If a steering maneuver now becomes necessary in which this wheel is steered against the step or curbstone and is to drive over the step or curbstone in the upward direction, extremely high steering forces are required. Such situations may occur when only little maneuvering space is available for a vehicle parked on the road side directly next to a higher curbstone, because other vehicles are parking closely in front or closely behind the above-mentioned vehicle.

In such extreme situations, the present invention provides that the forced coupling between the steering handle and the steered vehicle wheels becomes operative in parallel to the adjusting drive. The driver can thus assist the adjusting drive by manual force, with the result that total steering forces can be generated which clearly exceed the efficiency of the adjusting drive.

As the result of the corresponding dimensioning of the steering adjusting drive, similar manual forces occur on the steering handle during the above-mentioned extreme steering maneuvers as those occurring in comparable driving situations in conventional power steering systems, which have a continuously effective mechanical drive-through between the manual steering wheel and the steered vehicle wheels and whose servo motor only generates a limited auxiliary force which assists the respective steering maneuver, in addition to the manual force to be applied by the driver.

In operation of the forced coupling which assists the steering adjusting drive, a parameter is analyzed or detected by the automatic control system. This parameter is correlated with forces or torques transmitted between the steering handle and steerable vehicle wheels, whereby the automatic control system controls the steering adjusting drive only in parallel to the steering adjusting forces generated by the steering handle.

Because the automatic control system in addition, as in the normal operation, detects the parameter correlated with the transmitted forces or torques between the steering adjusting drive and the steered vehicle wheels or the parameter correlated with the forces on the steering adjusting drive, the automatic control system therefore always "knows" which total steering forces are effective on the steered vehicle wheels.

Correspondingly, the forced coupling can be opened up again as soon as the sum of the forces and torques transmitted between the steering handle and the steerable vehicle wheels as well as the forces and torques transmitted between the adjusting drive and the steered vehicle wheels falls below a definable or defined threshold value which is (at least slightly) below the maximal value of the forces or torques which can be generated by the adjusting drive.

With a view to the operational reliability, it has been recognized now as expedient for the automatic control system to record the relative positions of the steering-angle actual-value generator and of the steering-angle desired-value generator during the closing of the forced coupling. As a result, the automatic control system "knows", taking into account the steering kinematics, while the forced coupling is switched on of mutually corresponding signals of the desired-value generator and the actual-value generator. In this manner, it then becomes possible to automatically control the steering adjusting drive as a function of the amount and the direction of the deviation of the actual-value generator signal with respect to the signal of the actual-value generator which corresponds to the respective desired-value generator signal. Because of the unavoidable or constructively intended elasticities in the forced coupling, a deviation will occur between the signals of the actual-value generator, on one hand, and the above-mentioned corresponding values, on the other hand, which is analogous to the forces transmitted between the steering handle and the steered vehicle wheels.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
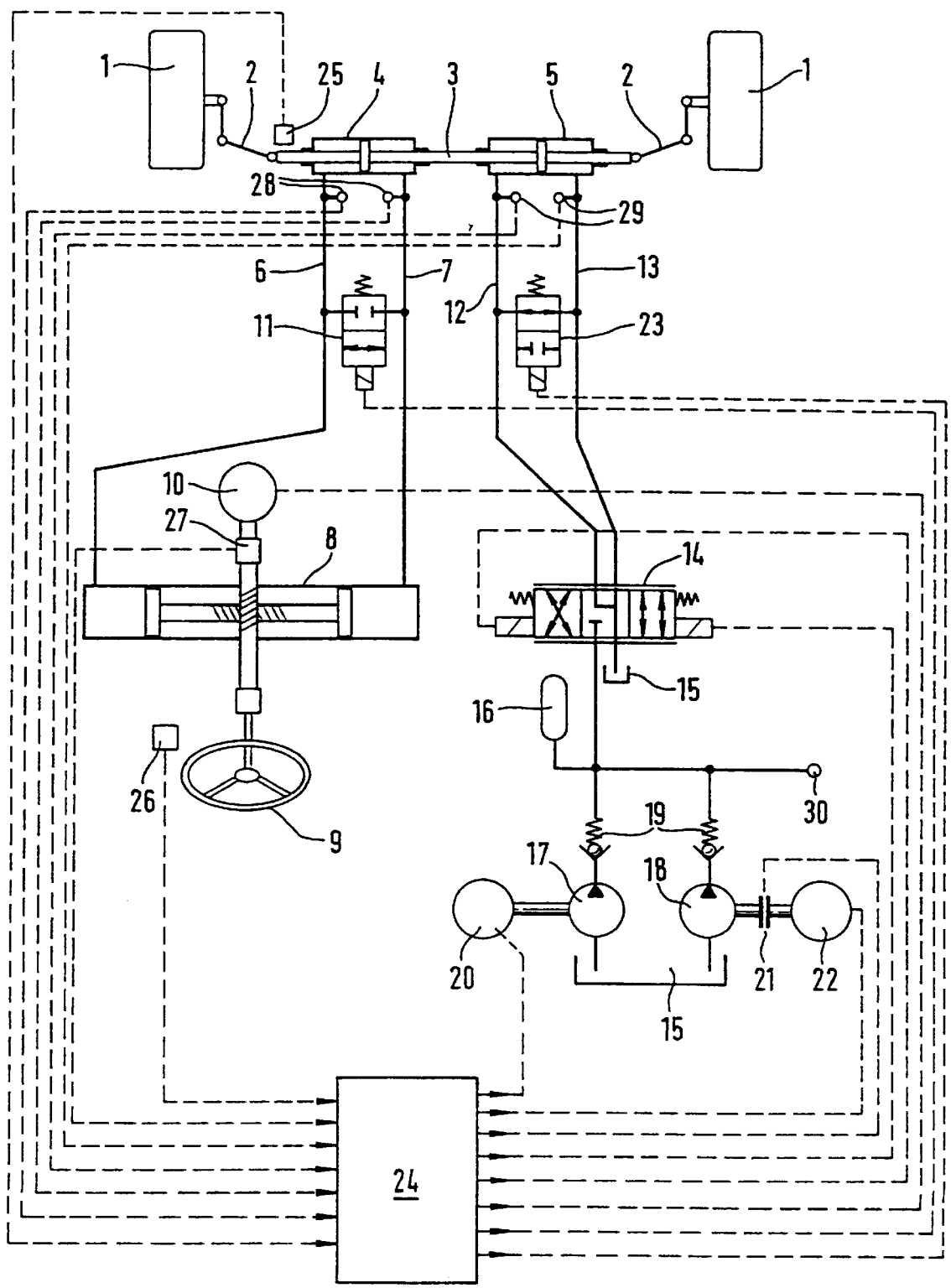
FIG. 1 is a schematic diagram of a first embodiment of the steering system in accordance with the present invention.

In the embodiment illustrated in FIG. 1, a motor vehicle has steerable front wheels 1 which are steering-adjustably coupled with one another by way of tie rods 2 and a rod 3. The rod 3 forms the piston rod of two piston-cylinder units 4, 5 which are arranged parallel to one another and which are each constructed as double-acting units forming a steering adjusting drive.

The piston-cylinder unit 4 is coupled by two hydraulic lines 6, 7 with the two piston working spaces of a double-acting piston-cylinder unit 8, whose pistons are mechanically forcibly coupled with a manual steering wheel 9. The pistons of the unit 8 are displaced to the right or the left when the manual steering wheel is turned clockwise or counter-clockwise. During the displacement of the pistons of the piston-cylinder unit 8, the manual steering wheel is rotated correspondingly.

In addition, the manual steering wheel 9 is connected with respect to the drive with an electric motor 10 which is irreversible and which, when the engine shaft is stopped, is capable of operating as a pure power generator for a purpose will be explained below.

Between the hydraulic lines 6, 7, a normally-closed shut-off valve 11 is arranged which, by energization of its operating magnet, can be switched over against the force of a restoring spring, from the illustrated closed position into its open position. When the electric current acting upon the operating magnet is switched off, however, the valve 11 is automatically brought by the restoring spring into and held in the illustrated closed position.

By way of hydraulic lines 12, 13, the piston-cylinder unit 5 is connected with two connections of a control valve 14. The latter is connected by way of two additional connections with a relatively pressureless hydraulic reservoir 15 and a hydraulic pressure source, for example, a hydraulic pressure accumulator 16 and pumps 17, 18. The pressure accumulator 16 can be recharged by the pump 17 as well as the other pump 18. Both pumps 17, 18 are secured by return valves 19 against a return from the delivery side to their suction side and, on the suction side, are connected to the reservoir 15. The pump 17 is driven by an electric motor 20. By way of a shiftable clutch 21, the pump 18 can be connected with the schematically-shown engine 22 of the motor vehicle.

Between the hydraulic lines 12, 13, a normally open shut-off valve 23 is arranged which can be changed, by the electric energization of its operating magnet, against the force of a restoring spring from the illustrated open position into its closed position where it is held.

An electronic automatic control and control system 24 is connected on the input side with a generator 25 for the actual value of the steering angle of the front wheels 1. This generator 25 can interact, for example, with the rod 3 which, during the steering adjustment of the wheels 1, carries out an adjusting stroke analogous to the steering angle.

In addition, the input side of the automatic control and control system 24 is connected with a generator for the desired value of the steering angle operated by the manual steering wheel 9. The input side of the automatic control and control system is connected with a torque sensor 27 which senses the forces and torques effective between the manual steering wheel 9 and the piston-cylinder unit 8. The torque generated by the electric motor 10 can be determined by another sensor or, at least approximately, by the detection of the electric current flowing through the electric motor.

Finally, a large or sufficient number of pressure sensors 28, 29 and 30 are connected to the input side of the automatic control and control system. The signals of these sensors reflect the hydraulic pressure in the hydraulic lines 6 and 7, 12 and 13, as well as the pressure at the pressure input of the control valve 14. On the output side, the automatic control and control system 24 is connected with the operating magnets of the shut-off valves 11 and 23 as well as of the control valve 14. In addition, the electric motors 10, 20 and the clutch 21 are controlled by the output of the automatic control and control system.

In the normal operation of the steering system of FIG. 1, the switch-over valves 11, 23 are changed into unillustrated positions and held there by the automatic control and control system 24 by energizing the associated operating magnets. The piston-cylinder unit 4 is correspondingly hydraulically uncoupled from the piston-cylinder unit 8 as well as from the manual steering wheel 9.

The pressure difference between the two piston working spaces of the piston-cylinder unit 5 is controlled by the operation of the control valve 14. Specifically, the automatic control and control system 24 detects the actual value of the steering angle of the front wheels 1 by way of the generator 25. The automatic control and control system 24 receives the desired value of the steering angle via the generator 26 operated by the manual steering wheel. Corresponding to a desired-actual value comparison carried out by the automatic control and control system 24, the operating magnets of the control valve 14 are then controlled.

If there is no desired-actual value deviation, the control valve 14 remains in the illustrated center position. In that position, the piston-cylinder unit 5 is hydraulically switched to free-running and is connected with the reservoir 15, while the pressure accumulator 16 which, as a function of the signal of the pressure sensor 30, is constantly recharged as required by way of the pumps 17, 18, is shut-off with respect to the piston-cylinder unit 5. If a desired-actual value deviation occurs, the control valve 14 is displaced from the illustrated center position, according to the direction of the desired actual value deviation, toward the right or the left. Thereby, in each case, a piston working space of the piston-cylinder unit 5 is controllably connected with the pressure connection of the control valve 14, and the other piston working space of the unit 5 is controllably connected with the reservoir 15. A controllable pressure difference becomes effective at the piston-cylinder unit 5 with the result that the piston-cylinder unit 5 generates an adjusting force in a direction defined by the direction of the desired- actual value deviation of the steering angle. In this manner, a desired-actual value deviation of the steering angle is controlled within a short time and the front wheels 1 follow the steering adjustment of the manual steering wheel 9.

From the signals of the pressure sensors 29 and/or from the electric voltages and current intensities on the operating magnets of the control valve 14, the automatic control and control system 24 can directly or indirectly determine the pressure difference effective at the piston-cylinder unit 5. The extent of this pressure difference is correlated with the forces and torques transmitted between the steered wheels 1 and the piston-cylinder unit 5. In a correlation with these forces, the automatic control and control system 24 determines a desired value for a manual force which can be felt at the manual steering wheel 9, and this desired value is set by a corresponding control of the electric motor 10. In this case, the torque sensor 27 senses the forces and torques effective between the electric motor 10 and the manual steering wheel 9 and thus detects the actual value of the manual force. The motor 10 is thus controlled as a function of a desired-actual value comparison for the manual forces. As a result, the driver obtains at the manual steering wheel 9 a haptic feedback of the forces effective between the steered vehicle wheels 1 and the piston-cylinder unit 5.

The automatic control and control system 24 continuously monitors itself with respect to a correct operation. Furthermore, the signals of the generators and sensors 25 to 30 connected with the input side of the automatic control and control system 24 are continuously checked with respect to their plausibility. Should a system error be determined, the operating magnet of the shut-off valve 11 is switched to a current-free state. As a result, the shut-off valve 11 switches over into the closed position illustrated in FIG. 1, and the piston-cylinder units 4, 8 (and thus the steerable front wheels 1 and the manual steering wheel 9) are forcedly hydraulically coupled with one another.

If an error has occurred in the hydraulic system of the piston-cylinder unit 5 or appears to be possible, the operating magnet of the shut-off valve 23 is also switched to a current-free state, so that this valve 23 takes up the open position illustrated in FIG. 1 and the piston-cylinder unit 5 is switched to free-running under all circumstances. Conversely, if the hydraulic system of the piston-cylinder unit 5, including the control valve 14, is deemed to be operative, the piston-cylinder unit 5 can be controlled, similar to a conventional power steering system, for reducing the forces transmitted between the manual steering wheel 9 and the steered vehicle wheels 1.

In particular, when the hydraulic forced coupling between the piston-cylinder units 4, 8 is switched on, the pressure difference detected by the pressure sensors 28 between the lines 6, 7 according to the direction and amount is an analogous measurement with respect to the forces and torques transmitted between the manual steering wheel 9 and the steered vehicle wheels 1. As a function of the signals of the pressure sensors 28, the automatic control and control system 24 now controls the operating magnets of the control valve 14 so that the above-mentioned pressure difference is reduced. As a result, the illustrated steering system operates like a conventional power steering system.

In principle, a situation may occur during the normal operation, i.e., when the control valve 14 is controlled as a function of the desired-actual value difference of the steering angles which is detected by the actual and desired value generators that the piston cylinder unit 5, which is used as a steering adjusting drive for the wheels 1, reaches its constructively provided performance limit. This operating condition can be determined, on one hand, by analyzing the signals of the pressure sensors 29 because, in such an operating phase, pressure differences must occur between the lines 12, 13 which come close to the pressure at the pressure sensor 30. On the other hand, the electric voltages and current intensities at the operating magnets of the control valve 14 are also an indicator of the above-mentioned operating condition. The reason is that the extreme position of the control valve 14, which is characteristic of this operating condition, is reached only if energization of the operating magnets differs considerably.

If an operating condition in which the piston-cylinder unit 5 generates a very high force close to its performance limit is determined, the switch-over valve 11 is switched into the illustrated closed position to establish a hydraulic forced coupling between the manual steering wheel 9 and the steered vehicle wheels 1. This then permits the generation of an additional force by the manual steering wheel 9 which assists the adjusting force of the piston-cylinder unit. Steering forces can be generated in this manner which exceed the performance capability of the piston-cylinder unit 5.

In this operating condition with a particularly high steering force requirement, the automatic control and control system 24 controls the electric motor 10 preferably in a manner opposite to that in the normal operation. That is, during normal operation, the electric motor 10 simulates a steering resistance which is analogous to the adjusting force of the piston-cylinder unit 5, and thus operates against the manual force of the driver. In an operating condition with a high steering force requirement, the electric motor 10 preferably operates in a manner which assists the piston-cylinder unit. The electric motor 10 thus generates a torque which assists the driver at the manual steering wheel 9 and which is correlated with the signals generated by the sensor 27. As in the normal operation, the steering torque generated by the servo motor 10 in an operating mode with a high steering force requirement is detected by the sensor 27 or by way of the polarity and intensity of the electric motor current.

As soon as the driver operates the manual steering wheel 9 with a manual force which exceeds the steering resistance generated by the motor 10, on the basis of the hydraulic forced coupling between the piston-cylinders units 4, 8, an additional adjusting force for the steering adjustment of the wheels 1 becomes effective which is parallel to the adjusting force of the piston-cylinder unit 5.

The total steering forces effective at the steerable wheels 1 can be determined by the automatic control and control unit 24 from the signals of the pressure sensors 28, 29. The signals of the latter pressure sensor 29 optionally can also be replaced or checked for their plausibility by the detection of the energization of the operating magnets of the control valve 14 as well as of the signals of the pressure sensor 30.

The signals of the pressure sensors 28 can optionally be replaced or checked with respect to their plausibility such that, when the switch-over valve 11 is switched into the illustrated closed position, i.e., when the hydraulic forced coupling is established between the piston-cylinder units 4, 8, the automatic control and control system 24 stores the relation of the actual-value signal of the steering angle with respect to the desired value signal of the steering angle generated by the generator 26. Taking into account the hydraulic ratio between the hydraulic units 4, 8, the automatic control and control system 24 then "knows" which signals of the generators 25, 26 must coincide when no forces and torques (or at most vanishing forces and torques) are hydraulically transmitted between the piston-cylinder units 4, 8. During transmission of higher forces and torques, more or less high deviations of the signals of the generators 25, 26 will occur from the value pairings characteristic of vanishing forces because of elasticities of the walls of the lines 6, 7 as well as on the basis of the (although low) compressibility of the hydraulic medium.

When the switch-over valve 11 is closed and the forced coupling therefore exists between the piston-cylinder units 4, 8, it is important the signals of the generators 25, 26 are either ignored or are used in the manner described above by the automatic control and control unit 24 for the determination of forces hydraulically transmitted between the units 4, 8.

As a result, the automatic control or control system 24 knows the sum of the steering adjusting forces which are generated in parallel by the piston-cylinder units 4, 5. As long as this sum is above or in the proximity of the forces which can be maximally generated by the piston-cylinder unit 5 alone, the forced coupling between the units 4, 8 (and thus the forced coupling between the manual steering wheel 9 and the steerable vehicle wheels 1) is maintained. As soon as the above-mentioned sum of forces falls below a threshold value, the switch-over valve 11 is opened up again by the automatic control and control system. The control of the control valve 14 will then again take place corresponding to the normal operation as a function of the desired-actual value difference of the steering angle determined by the generators 25, 26.

In order to avoid an impulse on the manual steering wheel 9 during the opening of the switch-over valve 11, the force of the piston-cylinder unit 5 is adjusted such that, by the corresponding controlling of the control valve 14 by the automatic control and control system 24, the forces transmitted between the piston-cylinder units 4, 8 only still have a small residual value. The direction of this residual force is aligned such that the piston-cylinder unit 4 generates a residual adjusting force in the same direction as the adjusting force of the unit 5.

In this context, in the above-described operating phase, during which the adjusting forces required for the steering adjustment of the steering wheels 1 are close to the performance limit of the piston-cylinder unit 5 or exceed this performance limit and, for this reason, in addition the forced coupling is established between the manual steering wheel 9 and the steered wheels 1, the electric motor 10 advantageously always, as in the normal operation, generates a steering resistance which is correlated with the adjusting forces generated by the piston cylinder unit 5.

According to a currently particularly preferred embodiment of the invention, the steering resistance generated by the electric motor 10 can decrease progressively when the forces which are hydraulically transmitted between the piston-cylinder units 4, 8 and which can be determined from the signals of the pressure sensors 28 or of the generators 25, 26, rise in comparison to the adjusting forces generated by the piston-cylinder unit 5, which can be determined from the signals of the pressure sensors 29 or the energization of the operating magnets of the control valve. As a result, the steering resistance generated by the electric motor 10 can therefore depend on the ratio of the forces generated by the piston-cylinder units 4, 5. As soon as the forces transmitted between the units 4, 5 fall or approach a vanishing value, the electric motor 10 is, however, again controlled normally in a normal correlation with the adjusting forces generated by the unit 5.

Figure 2:
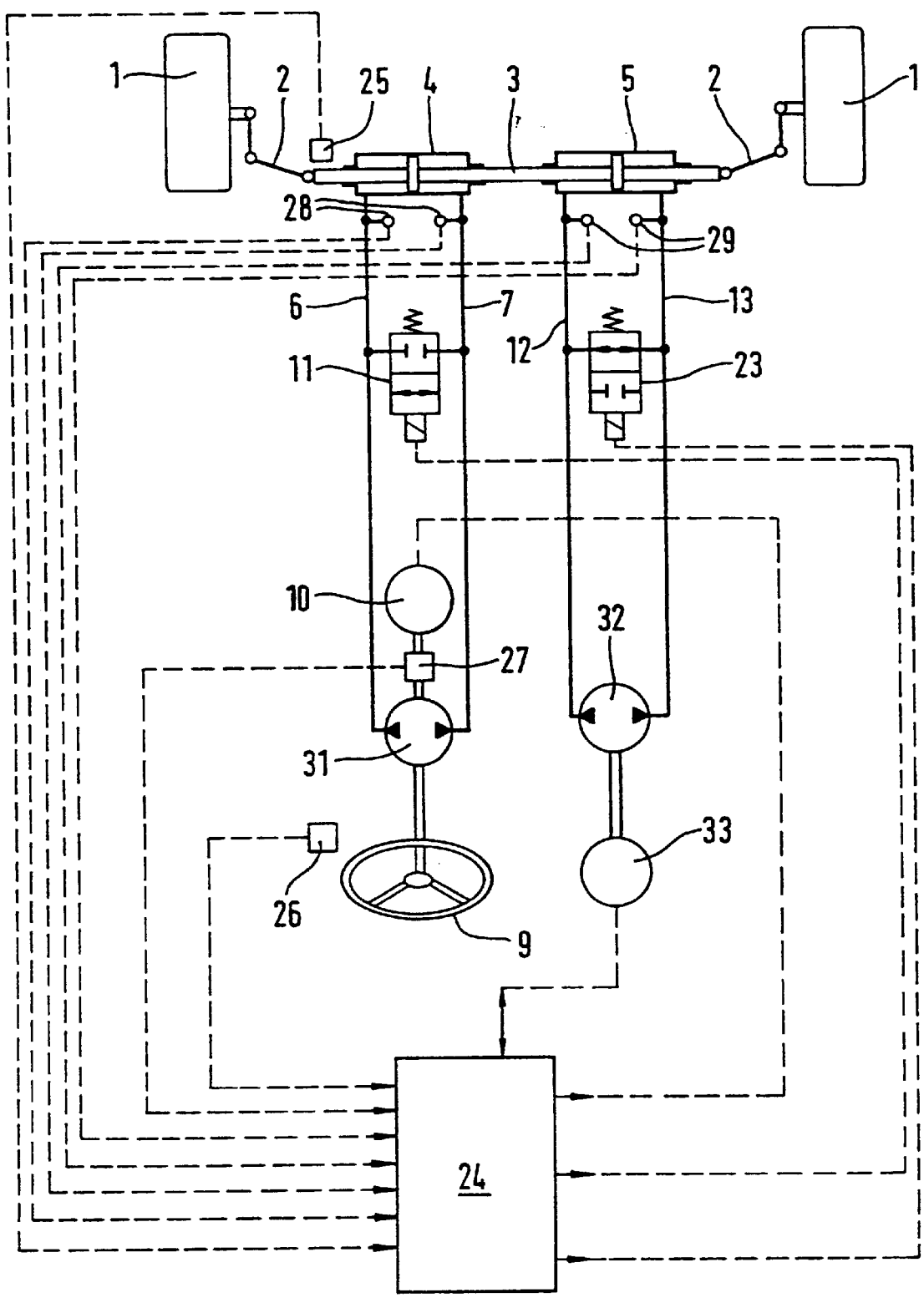
FIG. 2 is a similar diagram but of a second embodiment.

The embodiment illustrated in FIG. 2 differs from the arrangement according to FIG. 1 essentially in that the piston-cylinder unit 8 is replaced by a hydrostatic reversible pump 31. Thereby, hydraulic medium can be exchanged between the hydraulic lines 6, 7. With respect to the drive, this pump 31 is, on one hand, forcedly coupled with the electric motor 10 and, on the other hand, with the manual steering wheel 9. In addition, another reversible and preferably also hydrostatic pump 32 can connect the hydraulic lines 12, 13. For driving this pump 32, an electric motor 33 is used which is operated by the automatic control and control system 24.

The method of operation of the embodiment of FIG. 2 largely corresponds to the method of operation of the embodiment of FIG. 1. In particular, when the switch-over valve 11 takes up its closed position, the hydrostatic pump 31 and the piston-cylinder unit 4 and thus the steerable vehicle wheels 1 and the manual steering wheel 9 are forcedly coupled with one another.

This forced coupling will take place if the automatic control and control system 24 determines a malfunctioning in the steering system. If, in such a case, a malfunctioning exists on parts of the hydraulic system of the piston-cylinder unit 5 or seems possible, the current supply of the magnet of the switch-over valve 23 is automatically switched off so that the switch-over valve 23 changes over into the open position illustrated in FIG. 2 and the piston-cylinder unit 5 is under all circumstances hydraulically switched to free running.

In the normal operation, that is, when the automatic control and control system 24 detects no malfunction, the switch-over valves 11, 23 are held by the automatic control and control system 23 in each case in their positions not illustrated in FIG. 2. The electric motor 33 is then operated by the automatic control or control system 24 as a function of a desired-actual value comparison of the steering angle, that is, as a function of the difference between the signals of the generators 25, 26, in one or the other direction with a more or less high adjusting force so -that the piston-cylinder unit 5 transmits a corresponding adjusting force to the steered wheels 1.

If the electric motor approaches its performance limit, a forced coupling of the manual steering wheel 9 and the steered vehicle wheels 1 can again take place by the switch-over of the switch-over valve 11 into the position illustrated in FIG. 2, so that the driver is capable of assisting, by way of his manual force, the work of the electric motor 33 or of the piston-cylinder unit 5, as explained above with reference to FIG. 1.

Figure 3:
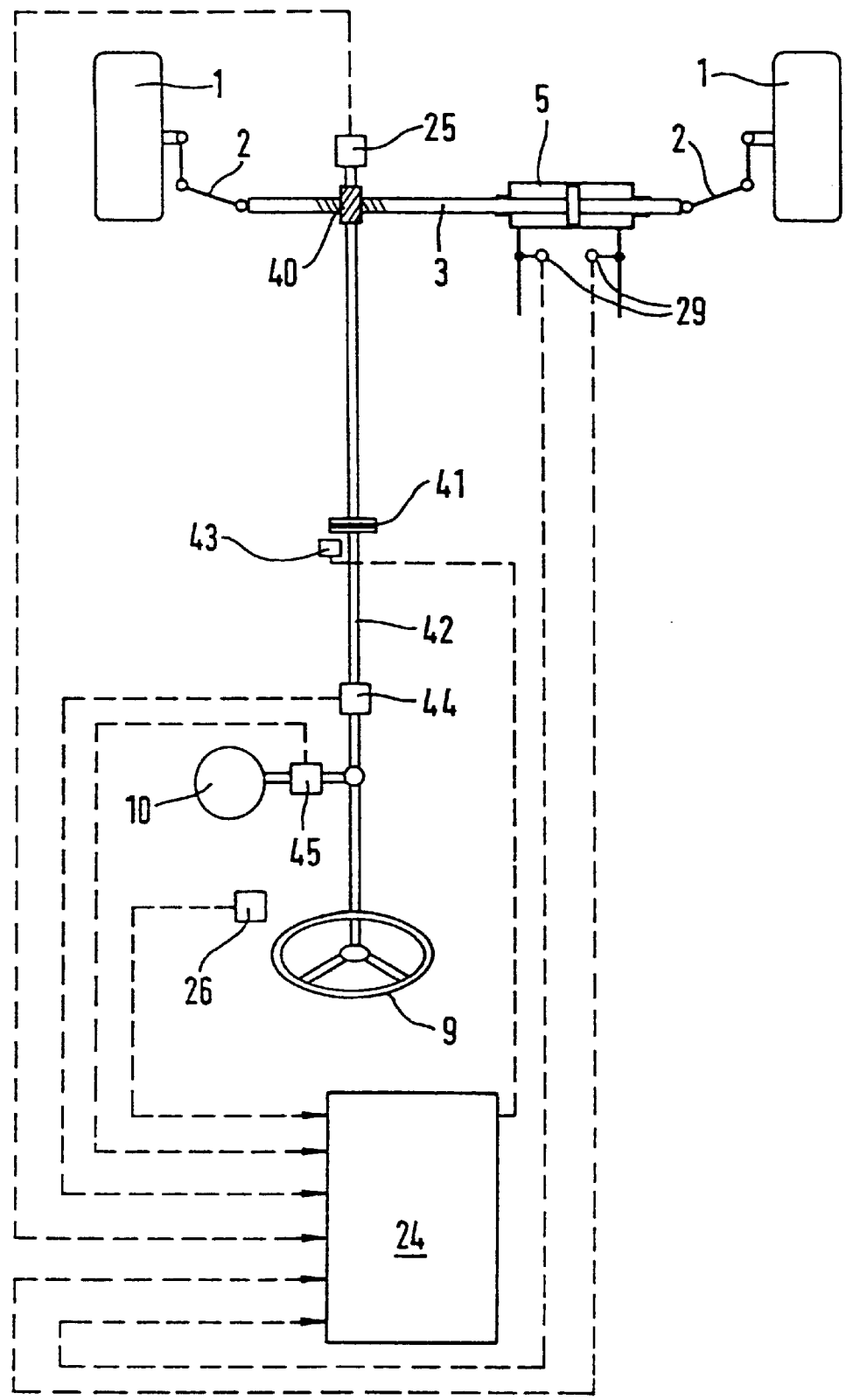
FIG. 3 is a similar view of yet another embodiment of the present invention.

The embodiment illustrated in FIG. 3 differs from the above-described embodiments first in that, for an emergency, a mechanical through-drive is provided between the manual steering wheel 9 and the steered vehicle wheels 1. For this purpose, the rod 3 in the illustrated embodiment is arranged as a toothed rack which meshes with a pinion 40 which, in turn, is mechanically connected with the manual steering wheel 9 by way of a clutch, which is acted upon in the closing direction by a spring, and an adjoining shaft 42. The clutch 41 can be opened by a servo motor against the force of its closing spring in order to open up a mechanical through-drive between the steered vehicle wheels and the manual steering wheel 9. With respect to the drive, this shaft 42 is also connected with a reversable electric motor 10 (non-irreversibly). Torque sensors 44, 45 are in each case arranged between the manual steering wheel 9 and the shaft 42 as well as between the electric motor 10 and the shaft 42.

The pinion 40 is connected with the generator 25 for determining the actual value of the steering angle which is constructed as an angle sensor. The shaft 42 is connected on the manual steering wheel 9 with the generator 26 which is also constructed as an angle sensor and which is used as a generator for the desired value of the steering angle in normal operation. In addition, the rod 3 again forms the piston rod of the piston-cylinder unit 5 which can be operated again according to the arrangement of FIG. 1 or 2.

In normal operation, the servo motor 43 of the clutch 41 is continuously energized by the automatic control and control system 24 such that it holds open the clutch 41 against the force of its closing spring. Furthermore, the automatic control and control system 24 operates the piston-cylinder unit 5 or the elements controlling this unit 5. Thereby, as the result of the adjusting forces generated by the unit, a possible difference is controlled between the desired value of the steering angle supplied by the generator 26 and the actual value of the steering angle supplied by the generator 25. For this purpose, reference is made to the descriptions of FIGS. 1 and 2.

In the event of possible system disturbances, the servo motor 43 is switched off by the automatic control and control system 24, so that the clutch 41 closes and the manual steering wheel and the steered vehicle wheels 1 are forcedly coupled with one another. If a disturbance is present in the hydraulic system of the piston-cylinder unit 5 or appears possible, the piston-cylinder unit 5 is simultaneously switched to hydraulic free running, as explained above with respect to FIGS. 1 and 2.

When the mechanical through-drive between the manual steering wheel 9 and the steered vehicle wheels 1 is switched to be operative because the piston-cylinder unit 5 has approached its performance limit and therefore an assistance to this unit 5 by the driver's manual force becomes necessary, the automatic control and control system 24 can determine the sum of the effective steering forces from the signals generated by the pressure generators 29, which signals reflect the adjusting force of the piston-cylinder unit 5, as well as from the signals generated by the torque sensors, which signals indicate the steering forces additionally transmitted by way of the clutch 41 to the wheels 1. The signals 45 of the sensor 45 can optionally be supplemented or replaced by the detection of the polarity and intensity of the electric current flowing through the motor 10.

The steering forces generated by the mechanical through-drive can optionally also be determined from the signals of the generators 25, 26 as well as from the polarity and intensity of the electric current flowing through the electric motor 10, provided that the automatic control and control system 24 has recorded the relation of the signals of the generators 25, 26 during the closing of the clutch and thus "knows" at which signal relation a condition of the shaft 42 exists between the generators 25, 26 which is free of torsional tension. During the torque transmission, the shaft 42 is torqued more or less, the extent of the torsion and thus the extent of the torques transmitted by the shaft 42 being determinable from the signals of the generators 25, 26.

The torque sensor 45 permits the steering resistance generated by the electric motor 10 to be determined in all operating conditions. As a result, the same operating mode can therefore be achieved as in the embodiment of FIG. 1.

Deviating from the illustrated embodiments, instead of the piston-cylinder unit 5, another adjusting unit, such as a non-irreversible electric motor, can be provided. In each case, the general concept of the present invention can be implemented, i.e., carrying out a forced coupling between the manual steering wheel 9 and the steered vehicle wheels 1 when the performance limit of the adjusting unit 5 is reached so that the driver can assist the adjusting drive 5 by way of the manual steering wheel 9.

As a rule, the transmission ratio between the rotating angle of the manual steering wheel 9 and the steering angle of the steered vehicle wheels 1 in the steer-by-wire mode will have a different value than in operating conditions with a mechanical or hydraulic forced coupling between the manual steering wheel 9 and the steered vehicle wheels 1. This is taken into account by the automatic control and control system 24 particularly if a switching-back from an operating phase, in which the steering adjusting drive or the piston-cylinder unit 5 operates in parallel with the assisting operation of the switched-on forced coupling between the manual steering wheel 9 and the steered vehicle wheels 1, takes place into the steer-by-wire mode.

Take, for example, a situation where the steered vehicle wheels 1 are first steered with an assisting operation of the forced coupling against a steering obstacle and are then steered back at a comparatively low steering resistance. During the return steering phase, the automatic control and control system 24 will then, during the newly switched-on steer-by-wire mode, change the transmission ratio between the rotating movements of the manual steering wheel and the steering angle change of the steered vehicle wheels such that the manual steering wheel 9 reaches its position assigned to the straight-ahead position of the steered vehicle wheels 1 when the steered vehicle wheels 1 arrive in their straight-ahead position. Subsequently, the transmission ratio can then be used which is normally provided for the steer-by-wire mode.

Departing from the embodiments illustrated in FIGS. 1 and 2, the sensor 27 can also be arranged on the manual steering wheel side of the unit 8 or of the pump 31. Departing from FIG. 3, the sensor 44 can also be arranged on the manual steering wheel side of the driving connection between the electric motor 10 and the shaft 42.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A steering system for a non-tracked motor vehicle, comprising a steering handle operatable by the driver;
    a steering adjusting drive for steering adjustment of steerable vehicle wheels;
    a steering-angle desired-value generator operable by the steering handle;
    a steering-angle actual-value generator operable by the steerable vehicle wheels;
    an automatic control system configured and arranged to control the steering adjusting drive as a function of a comparison of the desired and actual values of the steering angle and to continuously monitor itself as well as a sensor system interacting therewith for determining malfunctioning;

and a mechanical or hydraulic forced coupling arranged between the steering handle and the steerable vehicle wheels and opened up or remaining open in an inoperative normal condition when the automatic control system operates correctly and is automatically closed when the automatic control system is defective during an operative special condition, wherein the automatic control system is further configured to analyze or detect a parameter which is correlated with forces or torques transmitted between the steering adjusting drive and the steerable vehicle wheels and, with a certain loading of the adjusting drive, switches the forced coupling to be operative in an assisting manner and parallel to the steering adjusting drive, so that a manual force acting upon the steering handle is able to assist the adjusting drive.

2. The steering system according to claim 1, wherein the automatic control system analyzes or detects another parameter which is correlated with forces or torques transmitted between the steering handle and the steerable vehicle wheels when the forced coupling is established.

3. The steering system according to claim 1, wherein a manual force actuator is operatively connected with respect to a drive with the steering handle and is operable by the automatic control system during the inoperative normal condition of the forced coupling for simulation of a steering resistance correlated with the forces transmitted between the steered vehicle wheels and the steering adjusting drive, the manual force actuator being configured to generate a steering resistance correlated with the adjusting force of the adjusting drive also when the forced coupling of the steering handle and the steered vehicle wheels is switched to be operative in the assisting manner.

4. The steering system according to claim 3, wherein the automatic control system analyzes or detects another parameter which is correlated with forces or torques transmitted between the steering handle and the steerable vehicle wheels when the forced coupling is established.

5. The steering system according to claim 1, wherein the forced coupling between the steering handle and the steered vehicle wheels is opened up again as soon as the sum of the forces and torques transmitted between the steering handle and the steerable vehicle wheels, as well as the forces and torques transmitted between the adjusting drive and the steerable vehicle wheels falls below a definable or defined threshold value which is at least slightly below the maximal value of the forces and torques generatable by the adjusting drive.

6. The steering system according to claim 5, wherein the automatic control system analyzes or detects another parameter which is correlated with forces or torques transmitted between the steering handle and the steerable vehicle wheels when the forced coupling is established.

7. The steering system according to claim 6, wherein a manual force actuator is operatively connected with respect to a drive with the steering handle and is operable by the automatic control system during the inoperative normal condition of the forced coupling for simulation of a steering resistance correlated with the forces transmitted between the steered vehicle wheels and the steering adjusting drive, the manual force actuator being configured to generate a steering resistance correlated with the adjusting force of the adjusting drive also when the forced coupling of the steering handle and the steered vehicle wheels is switched to be operative in the assisting manner.

8. The steering system according to claim 5, wherein the steering resistance generated by the manual force actuator, which is correlated with the adjusting forces generated by the adjusting drive, is reduced when the forces, which are transmitted between the steering handle and the steered vehicle wheels, at least equal a threshold value and the adjusting drive operates in proximity to a performance limit thereof.

* * * * *